United States Patent
Behnen et al.

(10) Patent No.: US 7,814,459 B2
(45) Date of Patent: Oct. 12, 2010

(54) SYSTEM AND METHOD FOR AUTOMATED ON DEMAND REPLICATION SETUP

(75) Inventors: Marion Behnen, Austin, TX (US); Gregg L. Snodgrass, Round Rock, TX (US); Patrick Titzler, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1128 days.

(21) Appl. No.: 11/456,349

(22) Filed: Jul. 10, 2006

(65) Prior Publication Data
US 2008/0034015 A1 Feb. 7, 2008

(51) Int. Cl.
G06F 9/44 (2006.01)
G06F 9/45 (2006.01)
G06F 9/445 (2006.01)
G06F 7/00 (2006.01)

(52) U.S. Cl. .................. 717/104; 717/106; 717/137; 717/168; 717/174; 707/602

(58) Field of Classification Search .................. None
See application file for complete search history.

(56) References Cited

U.S. PATENT DOCUMENTS

| | | | |
|---|---|---|---|
| 6,151,608 A * | 11/2000 | Abrams | 707/679 |
| 6,490,590 B1 | 12/2002 | Fink | |
| 6,643,652 B2 * | 11/2003 | Helgeson et al. | 1/1 |
| 6,714,945 B1 * | 3/2004 | Foote et al. | 707/602 |
| 6,915,304 B2 * | 7/2005 | Krupa | 707/756 |
| 7,007,029 B1 * | 2/2006 | Chen | 1/1 |
| 7,257,820 B2 * | 8/2007 | Fischer et al. | 719/316 |
| 7,483,901 B1 * | 1/2009 | Massoudi et al. | 1/1 |
| 7,676,756 B2 * | 3/2010 | Vedula et al. | 715/763 |
| 7,703,071 B2 * | 4/2010 | Kuester et al. | 717/104 |
| 2004/0181783 A1 * | 9/2004 | Nagata et al. | 717/137 |
| 2005/0044197 A1 * | 2/2005 | Lai | 709/223 |
| 2005/0125463 A1 | 6/2005 | Joshi et al. | |
| 2005/0149584 A1 | 7/2005 | Bourbonnais et al. | |
| 2005/0165822 A1 * | 7/2005 | Yeung et al. | 707/102 |
| 2005/0256892 A1 * | 11/2005 | Harken | 707/101 |
| 2006/0130046 A1 * | 6/2006 | O'Neill | 717/168 |

OTHER PUBLICATIONS

U.S. Appl. No. 11/083,056, filed Mar. 16, 2005, "Regenerating Data Integration Functions for Transfer from a Data Integration Platform".

* cited by examiner

Primary Examiner—Michael J Yigdall
Assistant Examiner—Hanh T Bui
(74) Attorney, Agent, or Firm—Cantor Colburn LLP; Stephen Calogero

(57) ABSTRACT

A method of automatic replication setup is disclosed. The method allows the business application user to focus on the requirements posed by the business application and to abstract from the low level infrastructure details. Information specific to the databases and infrastructure design decisions can be provided by a subject matter expert. By automating the requirements analysis and infrastructure setup process, the time to deliver can be decreased significantly and the potential for errors reduced.

10 Claims, 14 Drawing Sheets

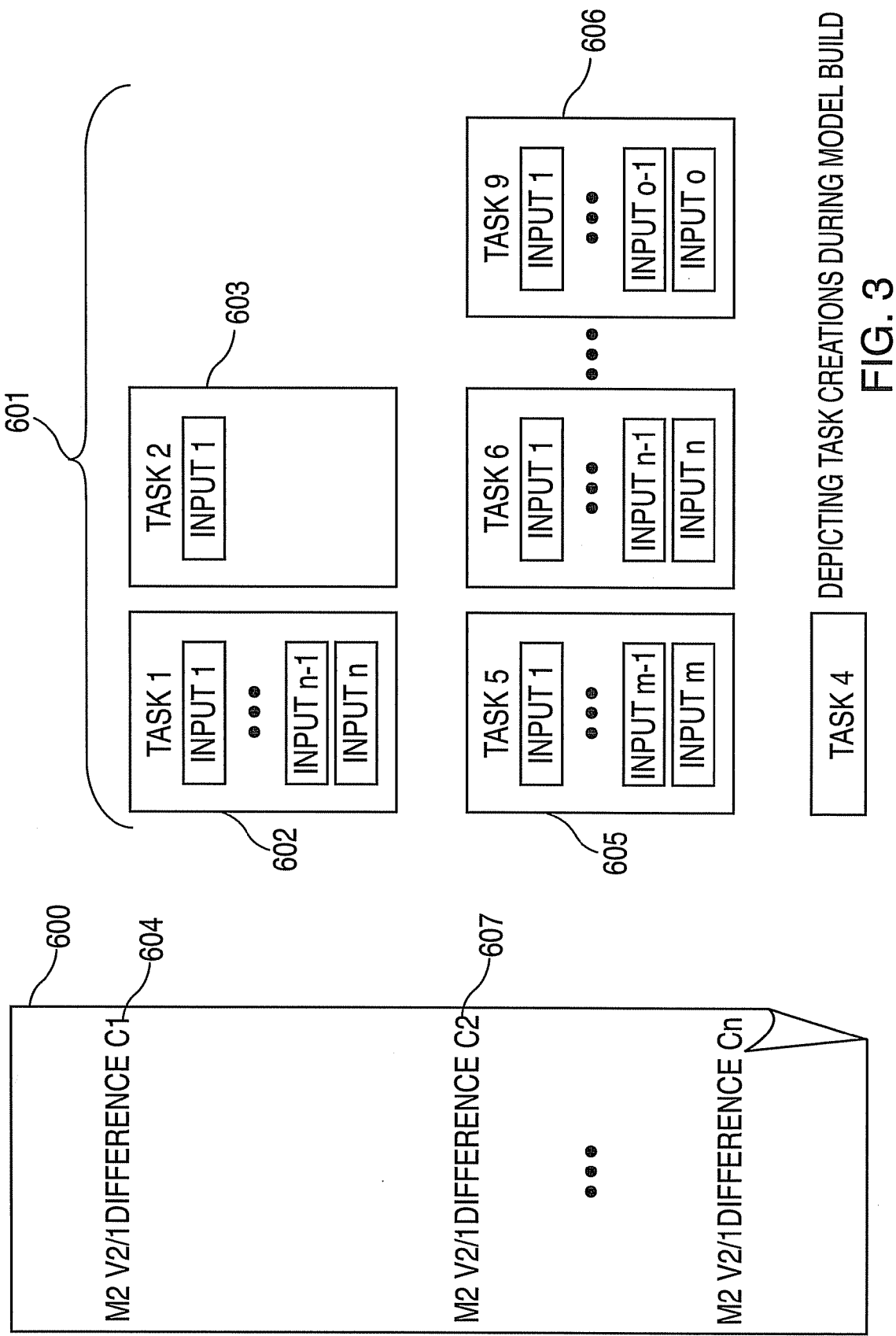
FIG. 3 DEPICTING TASK CREATIONS DURING MODEL BUILD

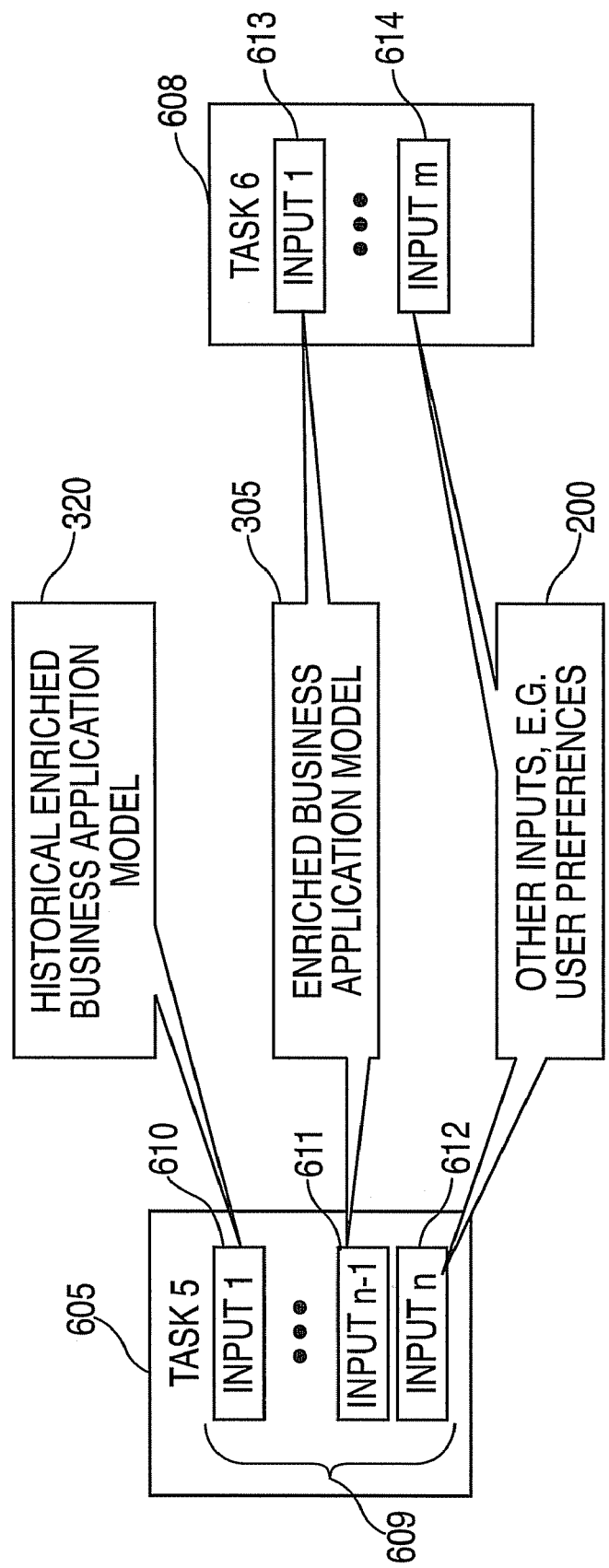
FIG. 4 DEPICTING TASK INPUTS

TASK MODEL FOR DELTA BETWEEN BUSINESS APPLICATION MODEL M2 VERSION 2 AND HISTORICAL ENRICHED BUSINESS APPLICATION MODEL M2 VERSION 1.

TM0(M2 V2/V1) = {T1, T2, T5, T6, T7, T8, T9}

DEPICTING A SIMPLE TASK MODEL

DEPICTING TASK TO SUB-TASK MAPPINGS AND THEIR INPUTS

DEPICTING IMPLICIT SUB-TASK TO CHANGE ARTIFACT MAPPING

DEPICTING A GENERIC ENRICHED BUSINESS APPLICATION MODEL

SYSTEM AND METHOD FOR AUTOMATED ON DEMAND REPLICATION SETUP

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to data replication, and particularly to automated data replication setup for movement of business data from a source data system to a target data system.

2. Description of Background

Before our invention, changes in business applications have required significant amounts of support and intervention from database administrators for replication of data within a business application system or from one business application system to another.

A business application generates or processes vast amounts of data that is located in one or more databases. Regardless of whether the application is an in-house project, an off the shelf application, or a vendor provided application, there is usually a need to move or distribute some or all of the data to one or more databases to allow for further processing.

The most common reasons for this need may include: separation of operational systems from analytical systems; performance; multiple analytical systems that address varying business questions, such as sales and trend analyses; and, delivery of information into other systems for various purposes, such as reporting.

Some business applications may provide their own data movement tools if the underlying data structure is rather static and simple. However, business applications can be dynamic by nature. They can provide the business user with the ability to create business level objects, modify business level objects, and define relationships between the business level objects. Business applications may also allow users to create high volumes of business level objects and business level relationships as well. These relationships among and between business level objects may change over time. Accordingly, there is often a need to utilize external data movement tools such as: in-house scripting and custom code; in-house frameworks specific to in-house structure and policies; off the shelf extract, transform, and load (ETL) tools; and ETL and replication tools provided with relational database management systems (RDBMS).

Internally, the business level objects and relationships are mapped to persistent storage structures, such as tables and columns, as managed and used by RDBMSs, for example. Changes to the underlying storage structure can have a direct impact on the data movement configuration. Currently, replication of a data structure that has undergone structural changes may require significant attention and database administration skills beyond those of the typical business user.

SUMMARY OF THE INVENTION

The shortcomings of the prior art are overcome and additional advantages are provided through the provision of an automatic method to setup the replication of business application data containing changes in the data structure without the need for highly skilled database administration.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that automates the process of analyzing and implementing the data movement requirements of a business application, thereby minimizing the amount of manual tasks required to define and monitor the replication environment by automatically determining the necessary deployment options. This minimization is extremely important to the value of this invention. This value is evident when one considers the amount of manual work that is involved in setting up data movement for a single table and then additionally setting up replication for 10s or 100s of tables per application, or even 10s or 100s of applications. This invention provides business users with the ability to make changes at the business level and have those changes reflected in the underlying data movement (replication) infrastructure with a reduction in the need for intervention or assistance from a database administrator. This further allows the invention to serve as a data movement and transformation provider for any business application that can provide a logical model description of the business data, relationships and mappings to the underlying storage structure. The solution provides a simplified and seamless data movement service that manages the specific data movement and transformation infrastructure details. For example, the solution takes care of writing deployment code, writing code to start and stop the data movement, and writing code to handle change management. The solution also enables an organization to take advantage of improvements in technology, such as new or improved data movement technologies for existing applications and use these improvements on previously deployed systems. Finally, the solution provides a customization mechanism to enable an advanced database administrator to make adjustments to the out of the box solution.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 illustrates one example of task creation during a model build in accordance with an embodiment of the invention.

FIG. 4 illustrates one example of task inputs in accordance with an embodiment of the invention.

Figure 1:
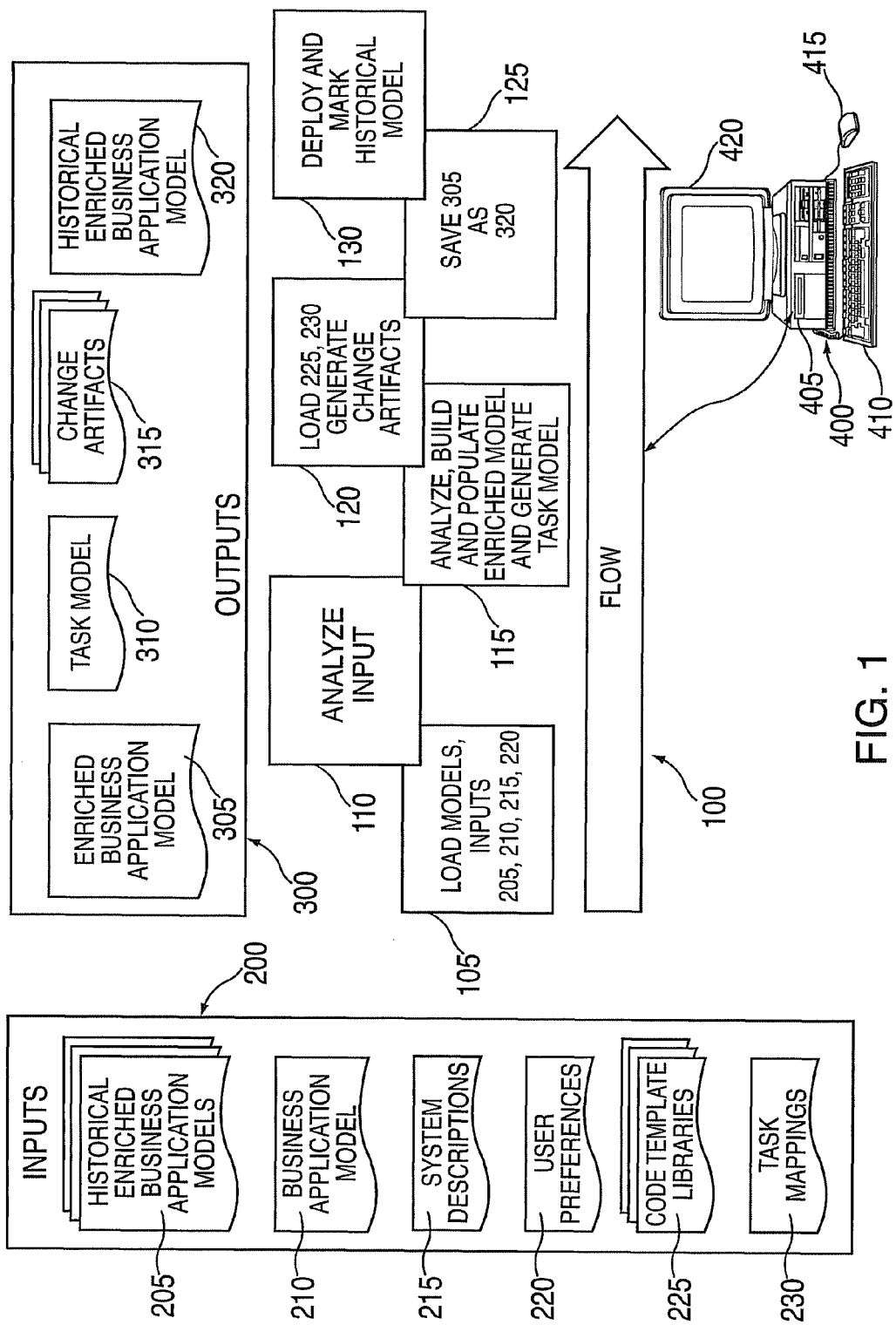
FIG. 1 illustrates one example of a method to replicate business data in accordance with an embodiment of the invention.
Figure 2A:
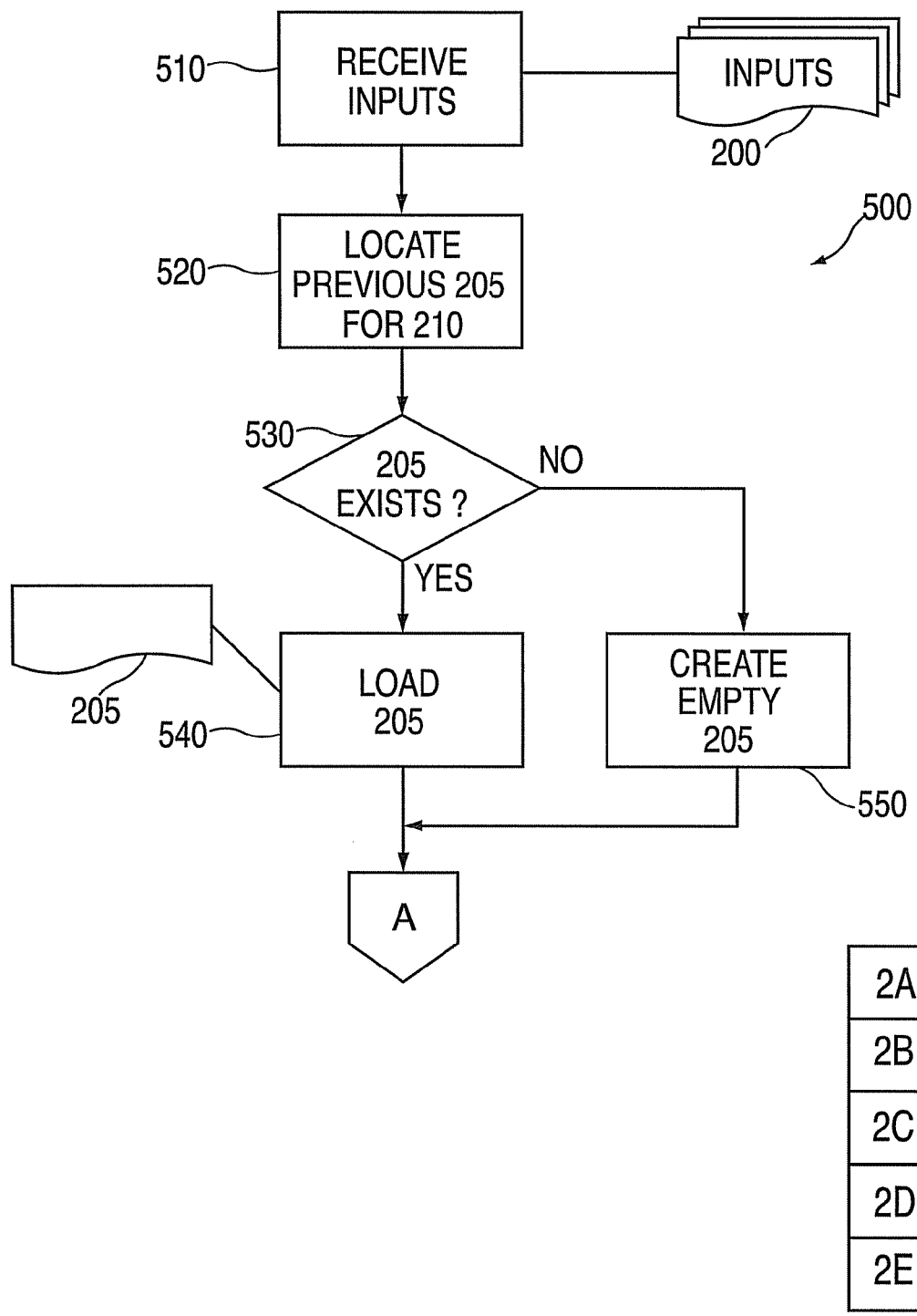
FIG. 2 illustrates one example of a detailed flowchart of a method to setup source and target systems to replicate business data in accordance with an embodiment of the invention.
Figure 2B:
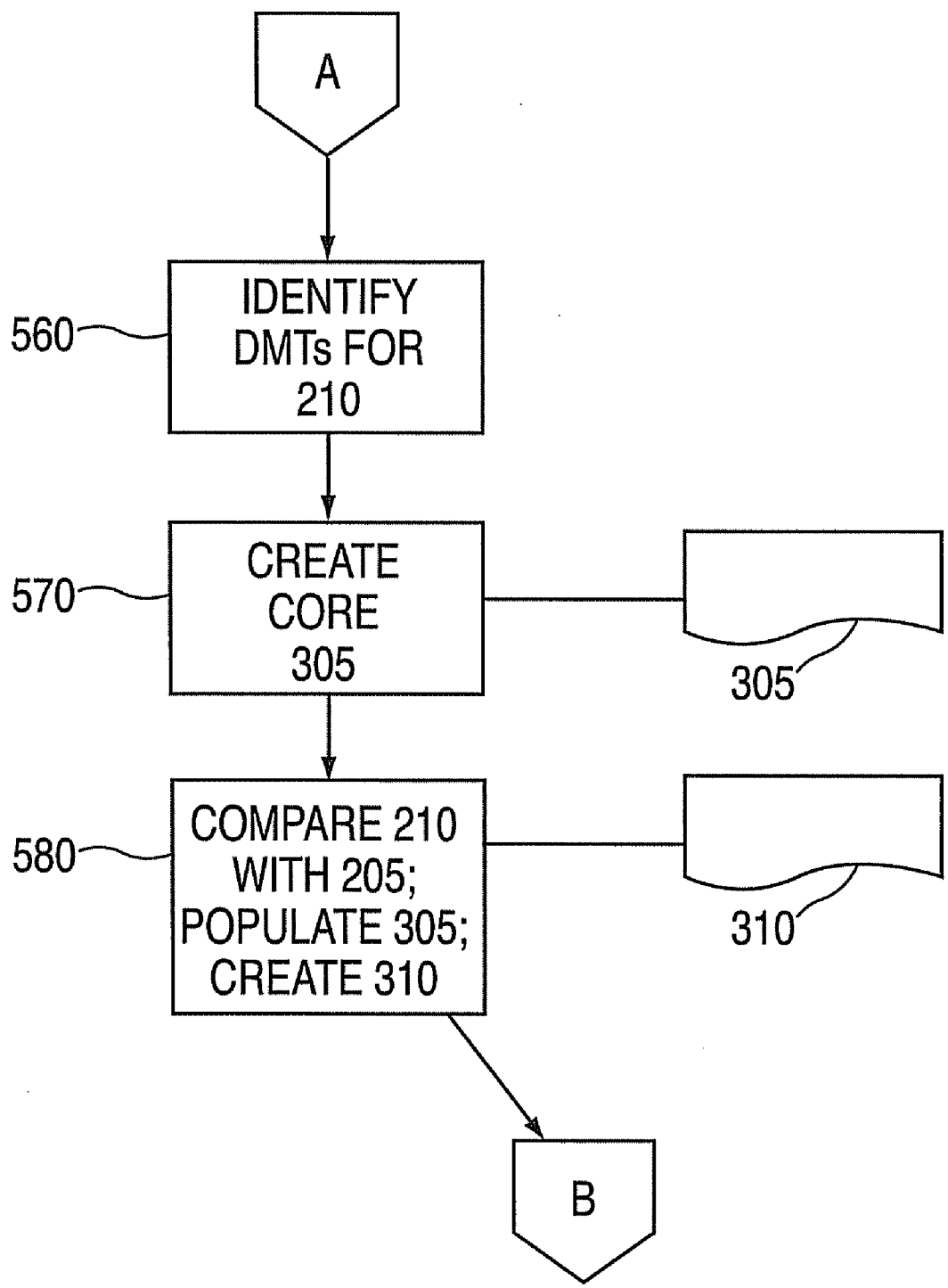
Figure 2C:
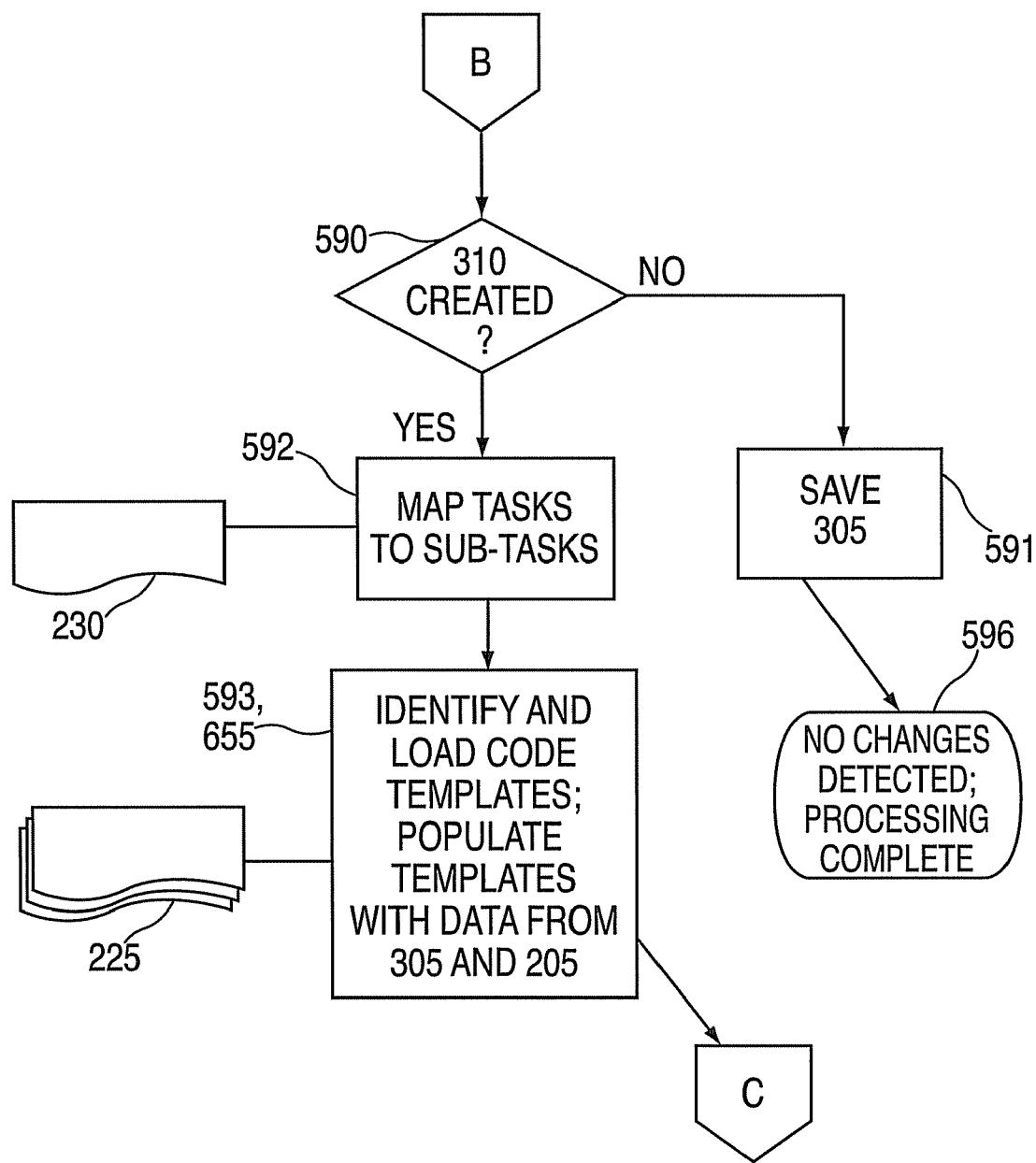
Figure 2D:
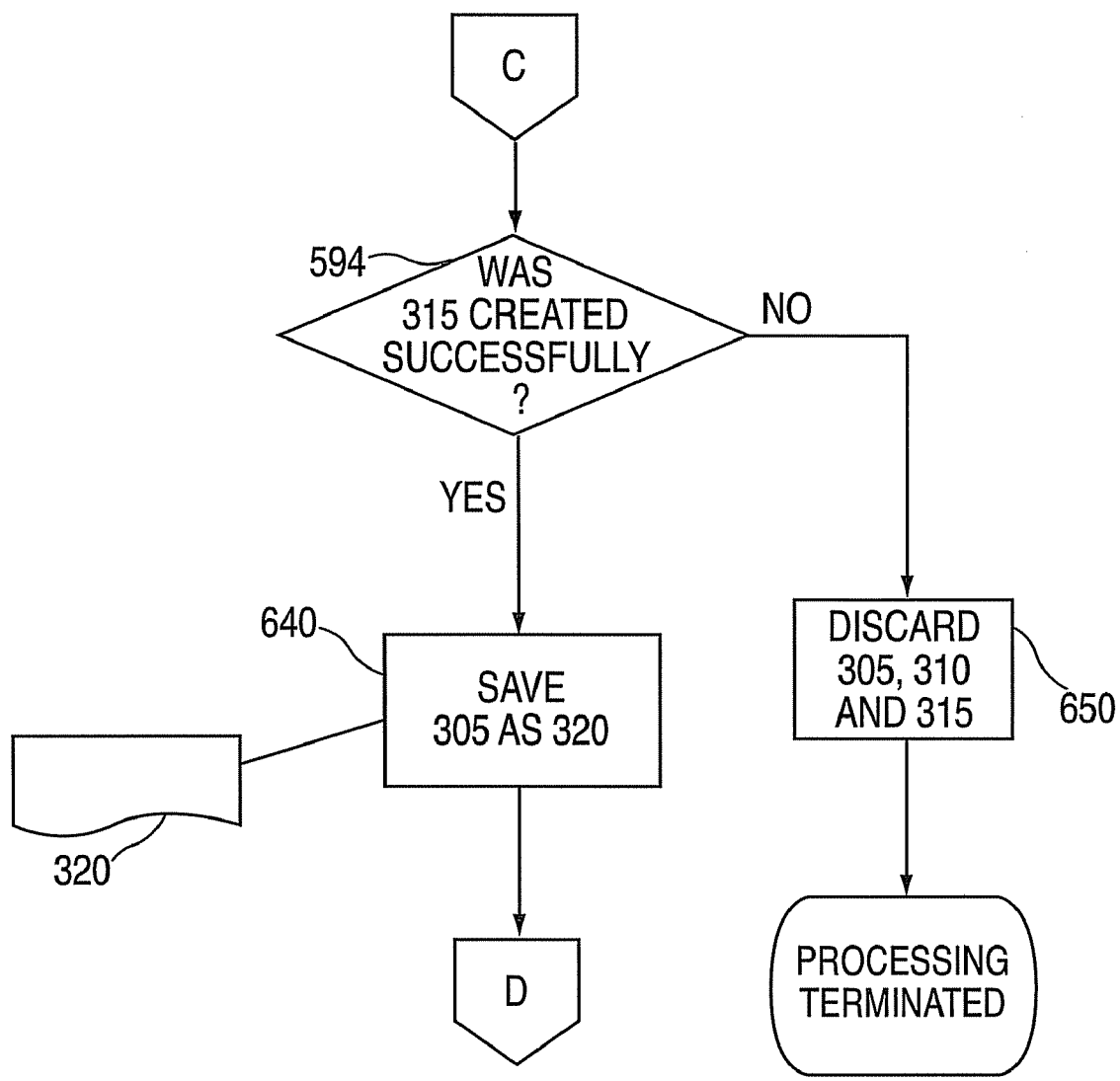
Figure 2E:
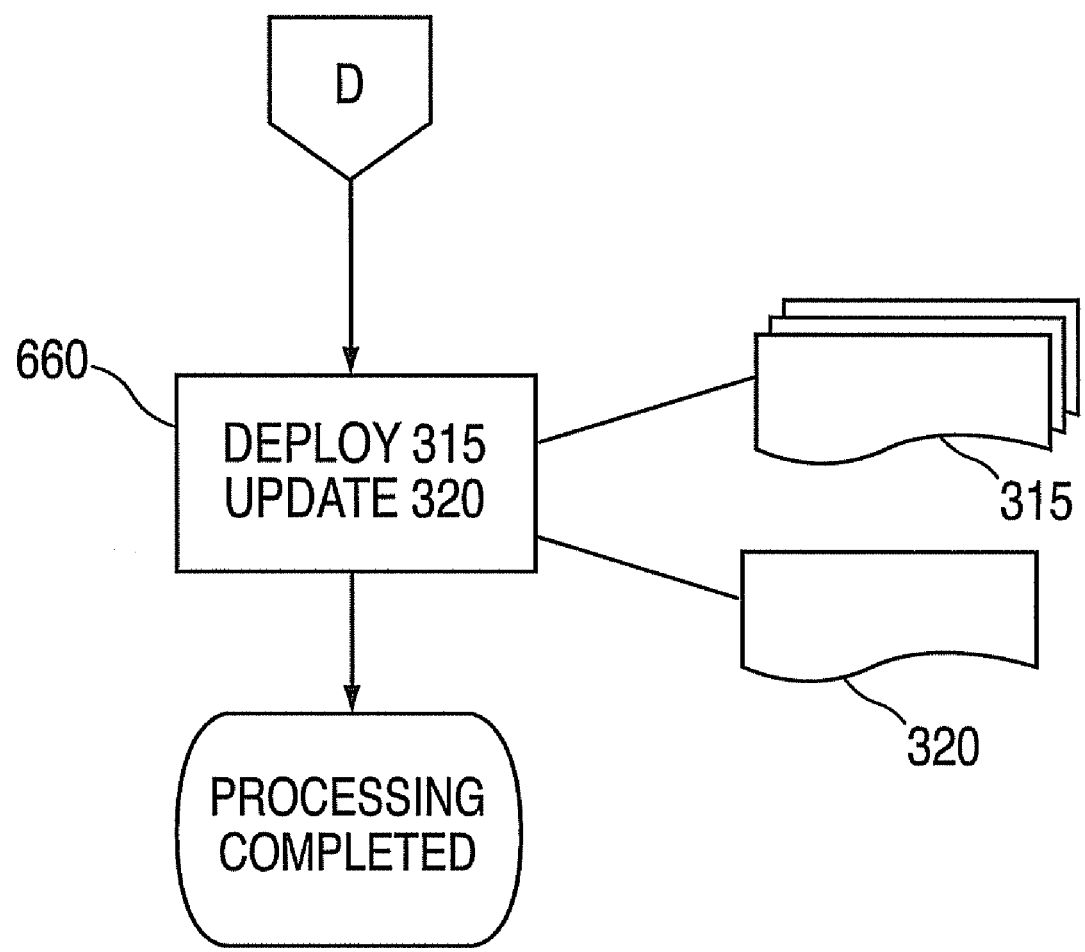

The detailed description explains the preferred embodiments of the invention, together with advantages and features, by way of example with reference to the drawings.

DETAILED DESCRIPTION OF THE INVENTION

From a business application point of view, it is desirable that a data movement tool support the following: automatic creation of the underlying infrastructure for data movement based on business level objects and relationships; deployment of the underlying database infrastructure; adaptation to various topologies and technologies, such as RDBMS differences, operating system differences, data movement technology differences, and various source to target configurations; adjustment to the data movement tool infrastructure to support new and changed business concepts or measures; and, error recovery.

Ideally, a business application user or administrator is able to inspect the status, such as stopped, running, or halted, for example and modify (for example, start, stop, pause) the data movement tool using a familiar business level perspective instead of the internal data movement perspective, which usually requires significant database administration skills. To support this administration scenario, the data movement tool may provide metadata about the underlying infrastructure to be used by the business application interface to self-manage the complexity and details of the utilized data movement technology.

When setting up replication between data sources (one or more databases) and data targets (the same or other databases), business application administrators are exposed to an enormous amount of technical detail. These details include, but are not limited to, the available replication technology concepts and how to use the tools that are provided by those technologies. Without the proper skills, a business application administrator has to defer most tasks to a database administrator or some other highly technical individual. Aside from the aspect of exposing a business application user to too many technical details, the setup task itself is can be time consuming and error prone. Most of today's tools being used to setup replication, require the same manual steps to be repeated for every table requiring replication, increasing the potential for errors. Taking into consideration how quickly the business application needs and available technologies can change, further underlines the advantage an automated data movement and transformation infrastructure setup can deliver.

The present invention addresses the shortcomings listed above, allowing the business application user to focus on the requirements posed by the business application and abstracting from the low level infrastructure details. Information specific to the databases and infrastructure design decisions (like site specific guidelines that are based on best practices) can be provided by a subject matter expert. By automating the requirements analysis and infrastructure setup process, the time to deliver can be decreased significantly and the potential for errors reduced. The method of automatic replication setup provided by the invention shall herein be referred to as a Replication Manager.

Referring now to FIG. 1, a general flow chart 100 to illustrate the method by which the invention is practiced, inputs 200 required, and outputs 300 generated in response to the method, are depicted. A processing machine 400, the processing machine having a program storage device 405, input devices 410, 415, and an output device 420, is also depicted.

The general flow of the method begins by loading 105 inputs 200. Following the loading 105 of the inputs 200, the inputs are analyzed 110 in order to determine the structure of an optimal enriched model 305 (alternatively referred to as an enriched business application model). Subsequent to the analyzing 110 of the inputs 200, the method continues with building 115 the enriched business application model 305, and identifying tasks, to build a task model 310. Continuing, the method maps the task model to change artifacts 315 and deployment artifacts 315 that create or alter the data movement infrastructure. Saving 125 the enriched business application model 305 as a historical enriched business application model 320, enables the method to process it as input 205 should another version of model 305 need to be processed. Finally, the artifacts 315 are deployed 130 and the historical enriched business application model 205 associated with those artifacts 315 marked as deployed.

Replication Manager's inputs 200 comprise of the business application model 210 to be processed, a system configuration description 215, user preferences 220, code template libraries 225 and task to sub-task mappings 230. Optionally, an enriched historical application model 205 is used as well if the same business application model 210 has been processed and the infrastructure been updated using the previously created change artifacts 315. The historical enriched business application models 205 can either be retrieved from a repository or reverse-engineered from an existing data movement infrastructure setup. Replication Manager's output will differ depending on whether an enriched business application model 205 has been previously deployed or not.

Input 210, the business application model (described for example using a markup language), defines the business level information via business application object definitions, the requirements for data movement and (optionally) transformation, the relationships between the business information and the underlying database storage structures, and the relationships between the database structures. The data movement and transformation information is not specific to the underlying technologies being used, allowing the user to abstract from the highly technical details. Essentially, business level information is mapped to groups of data sources, such as tables, and relationships between those sources and targets. These relationships between source and target database structures define the requirements for the data movement/transformation services that will be provided by the underlying infrastructure. The relationships between source and target business level objects can be expressed as a simple association, a specific transformation which can be passed straight through to a specific transformation technology, or as complicated as a high level language which can be translated or converted to a determined transformation technology. Using the latter further enhances the logical separation of the business application specification and technology implementation details.

The information stored in the business application model 210 does not contain any details about the underlying software, such as the type of operating system or the relational database system used to store the data. Therefore further abstraction from the data source specification is allowed. Note that this additional layer of abstraction is optional, which implies that the system configuration information could also be stored in the business application model. Input 215, the system configuration description, defines the data sources and data target configuration details, such as operating system attributes, RDBMS type and version, and available data movement technologies supporting source and target database combinations. Only technologies that support the specified system configuration description and meet the user preferences 220 are taken into consideration by Replication Manager when steps 110 and 115 are executed.

Given a system configuration description, multiple data movement technologies may qualify for use by Replication Manager. User preferences 220 allow the experienced administrator to customize the behavior of the analysis steps 110 and 115 to override any defaults. For example, given the choice of two technologies, Replication Manager might always choose one over the other given the current constraints. By specifying discriminating preferences, an administrator can alter that behavior. If supported by the template libraries 225, user preferences can also allow for the customization of the generated change artifacts 315 without having to modify the libraries 225 containing the code generation templates or having to alter the generated change artifacts 315 manually during post processing. By supporting customization using pass-through or variable type parameters, a template can easily be adjusted to meet guidelines set by a database administrator, for example when it comes to assigning names to database objects or tables to table spaces.

Changes in the business application model 210 also result in changes in the enriched business application model 305. Should any of those changes require an update of the data movement/transformation infrastructure for this business application model 210, certain tasks have to be processed and the appropriate change artifacts 315 to be created. Input 230, the task mappings 230, essentially links different types of change in the model 210 to the blueprints of the change artifacts 315. The task mappings 230 can be customized to accommodate the changing needs resulting from the emerging of new technologies or introduction of best practices.

Input 225, the code template libraries, serves as container for a set of code templates. A library contains parameterized code templates that are uniquely identified by template keys. Template keys will contain attributes including at least one of sub-task attributes, source operating system attributes, target operating system attributes, and database management system source and target type attributes. Note however, that template keys do not have to be necessarily unique across libraries. A code template contains one (or more statements) in a language that is interpreted by an API provided by the target technology. For example, a code template to create a temporary table in a database could contain one or more SQL statements. An advanced administrator can add new code templates or alter existing code templates to customize the predefined libraries if the configuration options available through the user preferences 220 do not provide the level of customization necessary.

Input 205, the historical enriched business application model, is the output 320 of a previous invocation of Replication Manager which used an earlier version of the same business application model 210 as the input. There are three general processing scenarios that Replication Manager supports. Depending on the scenario, input 205 may or may not be used. First, a business application model 210 is processed for the first time. No historical enriched business application model 205 exists yet, implying that no data movement/transformation infrastructure for this model has been setup before. Input 205 is not used. Second, another version of the same business application model has been processed before and the data movement/transformation infrastructure has been set up. Input 205 is used. Third, another version of the same business application model 210 has been processed before and the data movement/transformation infrastructure has been set up. The user's preferences 220 disable change management support, implying that a completely new data movement/transformation infrastructure has to be set up.

Based on above described inputs 205, 210, 215, and 220, Replication Manager determines, in steps 110 and 115 which data movement technologies should be used to move data from the source to the target and whether any data transformations are necessary. Once one (or more) data movement technologies have been selected, the enriched business application model 305 is built 115.

An enriched business application model 305, as depicted in FIG. 4, is comprised of three major components.

First, the business application model specification 210 (marked by the dotted line box), describing the business object to data structure mappings, relationships and constraints. The specification is independent from the business application system and expressed using a markup language, such as XML. For example, such a specification may describe in which tables and columns business level object X is stored in the source and the target database and which relationships and constraints are defined on those tables and columns. Based on this information, Replication Manager can determine which data movement/transformations need to be performed and how to perform them using the available technologies.

Second, the data movement/transformation infrastructure object specification which describes the technologies being used and how these technologies are configured. For example, Replication Manager might determine from the business application model specification 210 that data from table A in database DB_A needs to be moved to table B in database DB_B. Based on a set of rules, a particular replication technology, such as DB2 UDB SQL replication, is selected and the appropriate model objects representing the SQL replication components (Capture, Apply) created. In their entirety, these model objects contain all information (capture and apply name, subscription set name, table space assignments, etc) necessary to configure those components. This information is associated with information from the business application model 210 and will later be used to generate the change artifacts that actually modify the existing system.

Third, the Replication Manager metadata 212, which is required for the enriched business application model analysis and processing steps.

Some information from the enriched business application model 305 is made available through a metadata application programming interface (API). A client application, like the business application administrative user interface, can access and utilize this metadata API to provide the user with the capability to administer/monitor the data movement infrastructure using the familiar business object perspective instead of the underlying proprietary data movement perspective.

The enriched business application model 305 contains all information necessary to setup/alter the data movement/transformation infrastructure, but it does not include the actual change artifacts 315 which will perform that work. These artifacts 315 are created based on the other output of the build process, the task model 310.

During the model build phase 115, the business application model specification 210 is compared with the latest processed and deployed enriched business application model version 205 of the same model (if this model has been processed previously). If this model has not been processed previously or has not been deployed previously, input 210 is compared against an empty model causing each model object to be treated like a new addition. Any model differences, such as additions, modifications or deletions of database objects, are identified and recorded in the current enriched business application model 305 and, if necessary, the appropriate tasks created.

Referring now to FIG. 3, a visual representation, depicts differences 600 C1 through Cn between business application model M2 version 2 and version 1. Once detected, the difference is classified—either as significant (potentially requiring an infrastructure change) or insignificant (no infrastructure change necessary). The significant difference results in the creation of one or more tasks 601. In the example given, all differences 600 were considered significant and thus the following tasks 601 created; Task 1 602 and Task 2 603 for difference C1 604; Task 5 605 through Task 9 606 for difference C2 607, and so forth. Examples of significant model differences 600 are the introduction of new tables or the modification of existing tables.

The task 601 represents a high level unit of work, such as registering a table for replication, and does not contain the information of how this unit of work is implemented. However, it does provide access to information necessary for the unit-of-work implementation. FIG. 4 displays two tasks, Task 5 605 and Task 6 608, each one accepting inputs. Depending on its definition, a task 601 may require zero to n different inputs 609. Each input 609 is associated with one of the following: references to the enriched business application model 305; references to the historical enriched business application model 205; and other runtime information that could be of relevance during artifact generation, such as a customization setting that allows the user to affect directly the generated change artifact without having to physically alter a template in code libraries 225.

The provided model references allow for the navigation within the models for the purpose of retrieval of pre- and post change model specification values required to process the code templates.

In the example shown, Task 5 605 accepts n inputs 609 with Input 1 610 through Input (n–2) being associated with the historical enriched business application 320, Input (n–1) 611 being associated with the enriched business application 305 and Input n 612 being associated with some other input reference. Task 6 has m inputs assigned, with Input 1 613 through Input (m–1) referring to the enriched business application model 305 and Input m 614 some other runtime input.

These references allow for the navigation within the models for the purpose of retrieval of pre- and post change model specification values required to populate the code templates. Optionally, a task may also contain references to user preferences 220, allowing for template customization without having to physically alter any code template libraries 225.

Tasks that have been created by the enriched business application model build process 115 are added to task model 310 in the order they were created. Once the model build process 115 has completed, the generated task model 310 is processed 120 to appropriately reflect enriched business application model 305 changes in the business application data movement/transformation infrastructure. The task model 310 can contain zero (no changes where found in this version of the business application model) to n tasks with no restriction as to how many times the task occurs. The Replication Manager task model 310 is specific to exactly one enriched business application model version and exactly one historical enriched business application model 205 (if one existed) and only exists during the execution of the model build phase 115 and the artifact generation phase 120.

Figure 5:
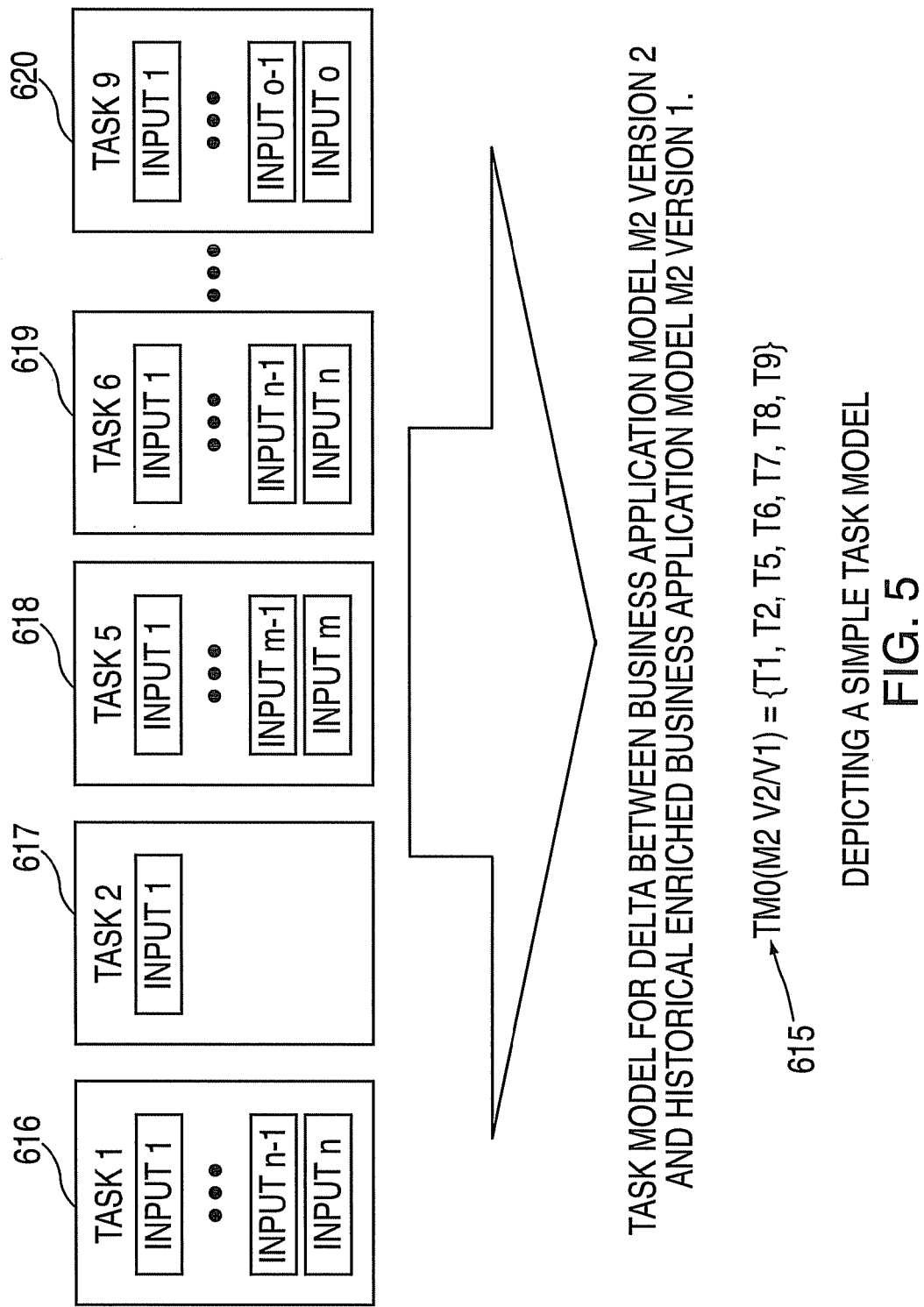
FIG. 5 illustrates one example of a simple task model in accordance with an embodiment of the invention.

Referring now to FIG. 5, a simple task model TM0 615, comprising tasks T1 616, T2 617, T5 618, T6 619, T7, T8, and T9 620 is depicted. In the simple task model 310 implementation, tasks are processed in the order they were added to the model 310. Therefore the tasks in TM0 615 will be processed in the following order: T1, T2, T5, T6, T7, T8, T9. Note however, that tasks are not necessarily executed in this order if tasks have priorities assigned. Doing so allows for the decoupling of the model build process 115 execution order from the change artifact 315 execution order, which might be necessary if non trivial dependencies between tasks exist. If tasks T5 through T9 had higher priorities assigned than tasks T1 and T2, the task model 310 would be processed in the following order: T5, T6, T7, T8, T9, T1, T2 (assuming that priority(T5)>priority(T6)> . . . >priority(T2)).

Tasks are associated with model changes and cannot be modified directly. To allow for extension and customization, a task T is therefore mapped to zero to n sub-tasks (STn) using task mapping 230. A task to sub-task mapping defines: which sub-tasks need to be processed when a task is processed; the order in which the sub-tasks are to be processed; and where the sub-tasks output (which is a change artifact 315) is to be deployed, on the source or target system.

Replication Manager externalizes these mappings, which can be expressed using a markup language, and enables the advanced administrator to alter the out-of-the-box behavior of the invention by adding, modifying or removing task to sub-task mappings.

Figure 6:
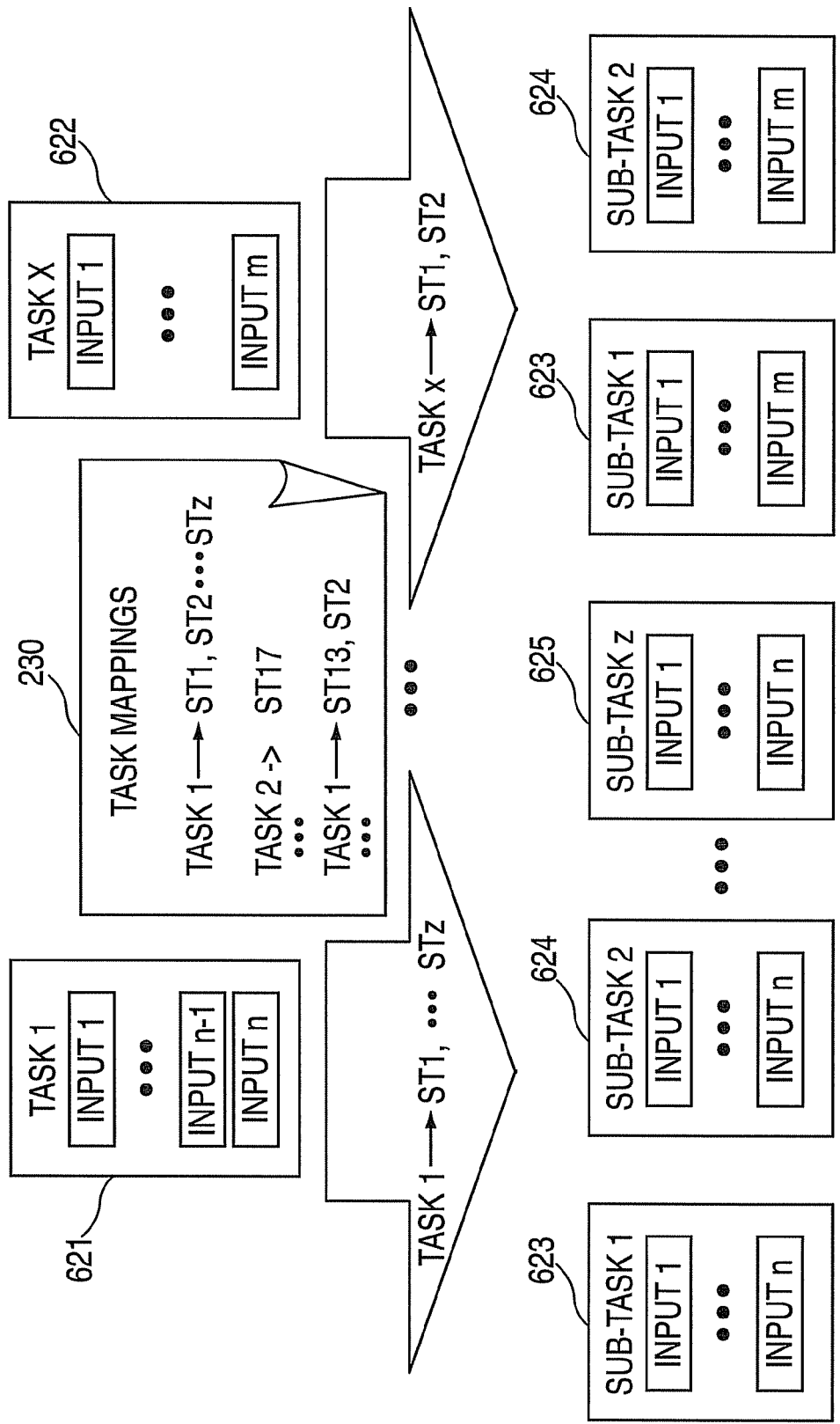
FIG. 6 illustrates one example of task to sub-task mappings in accordance with an embodiment of the invention.

Referring now to FIG. 6, visual mappings for Task 1 621 and Task x 622 are depicted. Task mapping 230 maps Task 1 621 to sub-tasks ST1 623, ST2 624, . . . through STz 625, and Task x 622 to ST1 623 and ST2 624. During processing, each sub-task inherits the inputs that were assigned to its parent task. In the example shown, task 1 621 is mapped to z sub-tasks (ST1, ST2, ST3 . . . STz), each one having access to inputs (Input 1 . . . Input n) that were assigned to parent task 1. Task x 622 maps to two sub-tasks (ST1 623 and ST2 624) that inherit the parent inputs (Input 1 . . . Input m).

Figure 7:
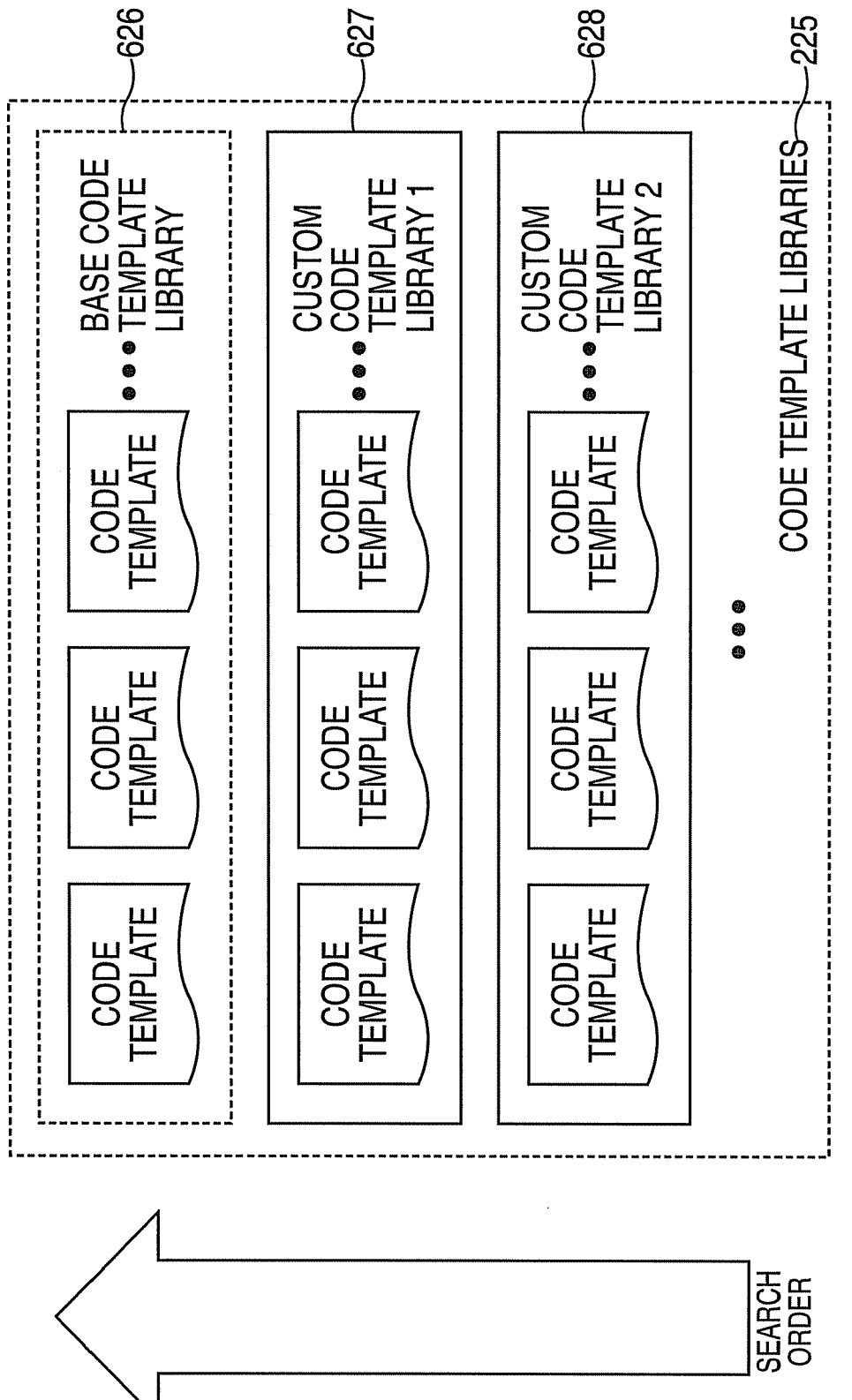
FIG. 7 illustrates one example of code libraries in accordance with an embodiment of the invention.

Whereas the generated task abstracts from the data movement/transformation technology being used, the sub-task is specific and will resolve to exactly one code template which has been registered with input 225, the code template libraries 225. Replication Manager's code template libraries 225 are managed internally in a hierarchical form, ordered from lowest to highest level as shown in FIG. 7. The base library 626, containing a set of out-of-the-box templates, represents the top level and custom libraries 627, 628 can be added by means of plug and play as a child of the base library 626 or as the child of another custom library. A code template contains one (or more) statements in a language that is interpreted by an application program interface (API) provided by the target technology. For example, the code template to create a temporary table in a database could contain one or more structured query language (SQL) statements.

Figure 8:
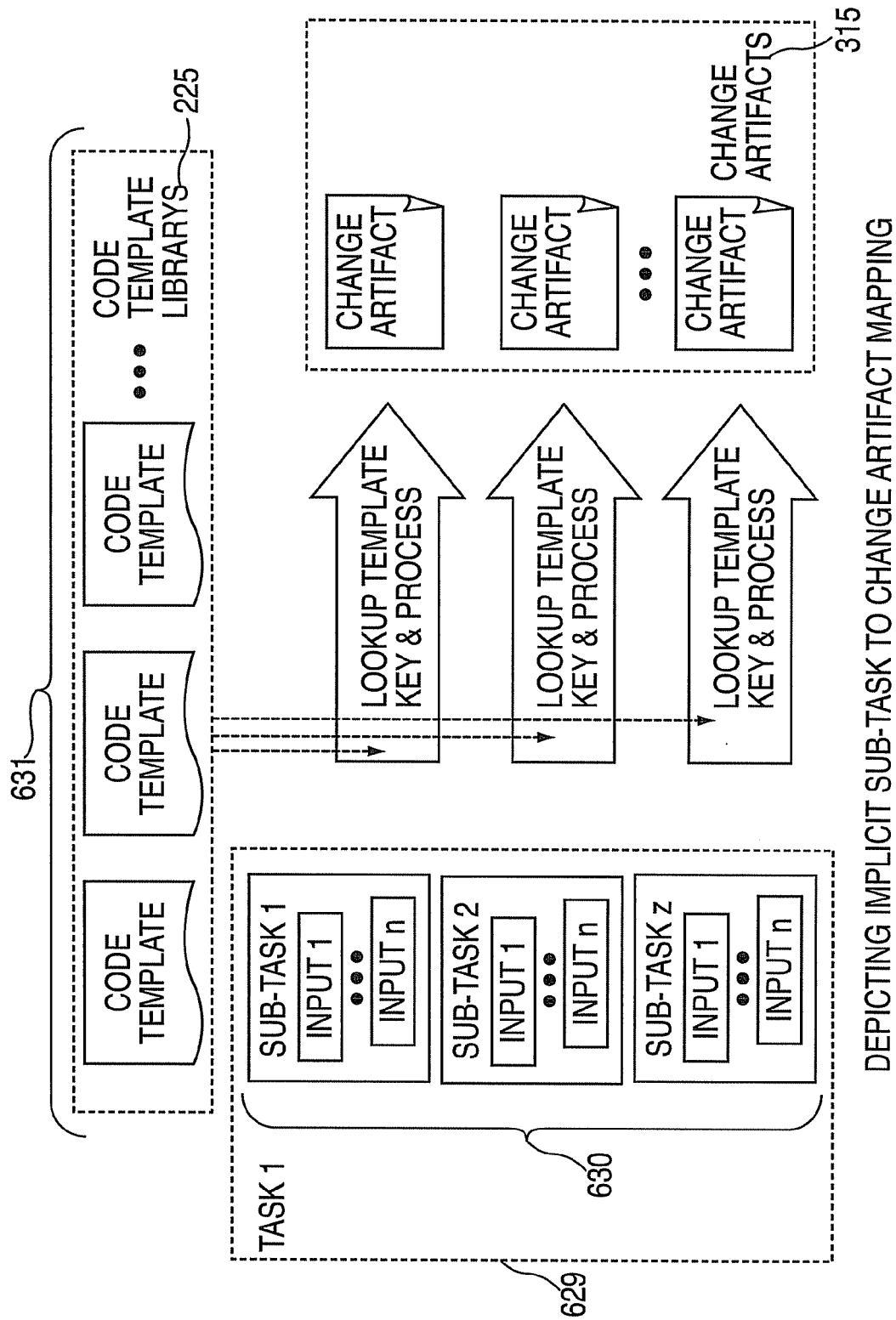
FIG. 8 illustrates one example of an implicit sub-task to change artifact mapping in accordance with an embodiment of the invention.
Figure 9:
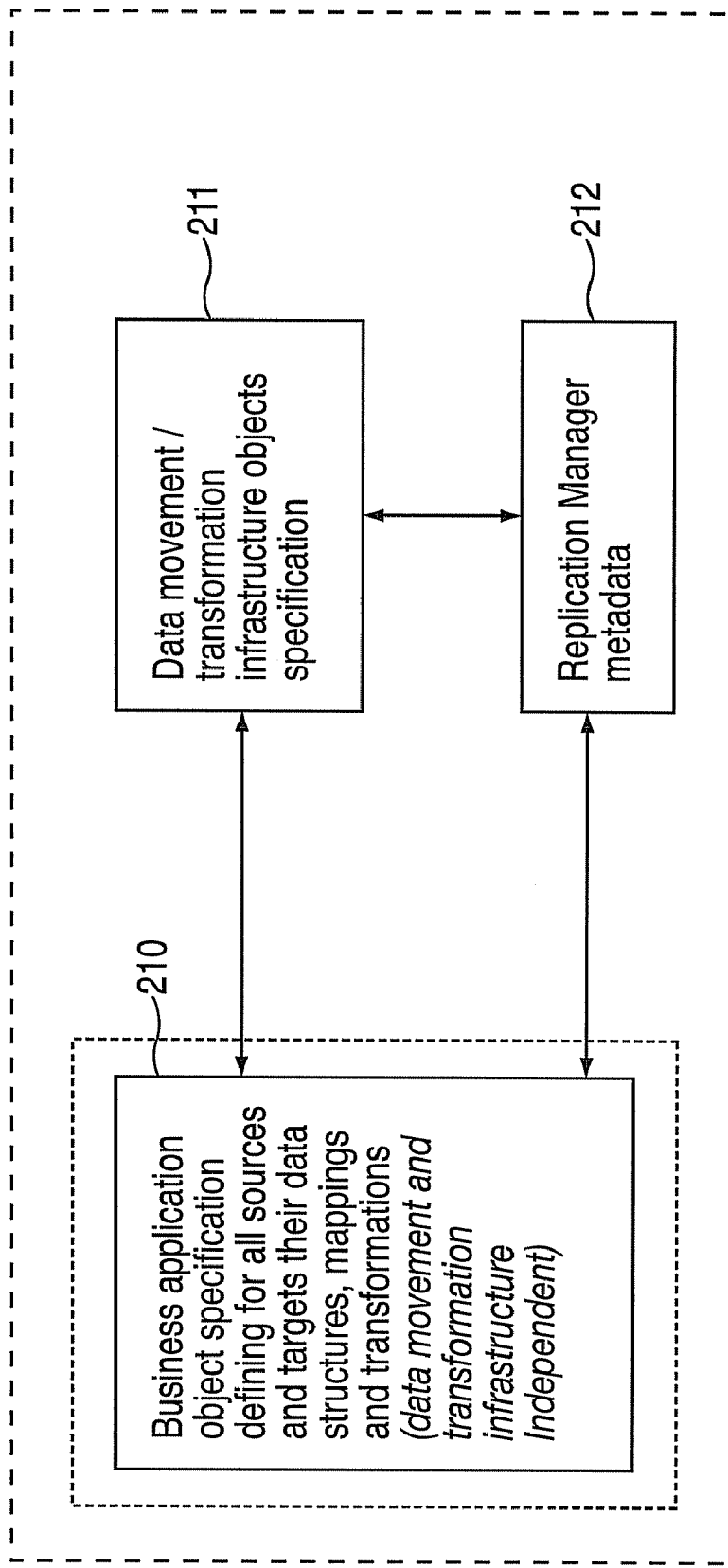
FIG. 9 illustrates one example of a high level view of the model being used to store business application specific metadata required by Replication Manager in accordance with an embodiment of the invention.

Referring now to FIG. 8 the relationships between tasks 629, sub-tasks 630, code templates 631 and change artifacts 315 are depicted. When task model 310 is processed in 120, task mappings 230 are loaded and each task 629 mapped to its sub-tasks 630. For each sub-task 630, a template key is calculated, factoring in the sub-task identifier and the system configuration description 215. Using this key, the corresponding template is loaded from one of the code template libraries. The code template libraries are searched in ascending order, locating the lowest level code template library containing the derived template key, starting with the custom libraries. Doing so ensures that the out-of-the-box templates are only used if no matching template could be located in any user (or third party) provided library.

A code template contains commands in a language that is interpreted by the utilities used to setup the data movement/transformation infrastructure. Typical examples for such commands include: SQL scripts, which are statements that create, alter or drop database objects or manipulate database object content (insert, update, delete); Proprietary language commands, or scripts, as defined by the data movement applications, such as ASNCLP for DB2 SQL Replication; and Operating system scripts, or shell commands.

Place holders in the template are replaced with calculated or retrieved values originating from the enriched business application model 305 and optionally, if it exists, the previously processed and deployed historical enriched business application model 205. To access those values, templates take advantage of navigation references the invoking task provides. In addition, templates can access any public information, like user preferences 220, that has been associated with the task. The populated code template represents the change artifact 315 and is stored for later execution.

A special set of templates in library 225 defines the deployment framework necessary to execute the generated change artifacts 315 and to provide logging and error recovery services.

Successful completion of change artifact generation step 120 causes the enriched business application model 305 to be stored in step 125 as historical enriched application model 320. Any failures during execution of steps 110, 115 or 120 will cause all outputs 300 to be discarded to return the system to a consistent state and processing is terminated.

Unless all deployment framework artifacts contained in 315 have been executed successfully, the information stored in the enriched business application model 305 is not consistent with the data movement infrastructure. To prevent this error scenario, a newly created enriched business application model 305 is marked as not deployed by default. After successful deployment of all deployment framework artifacts, the infrastructure is appropriately reflected by the enriched model and the appropriate metadata information updated.

In an embodiment, the Replication Manager can be used without any adjustments. However, an administrator can directly define the effect that a specific business model 210 change will have on the data movement artifacts 315 being generated by changing the sub-task mappings and templates stored within the library 225. Additionally, the Replication Manager may include a utility (or wizard) that interactively walks the administrator through the process of adding, changing or removing task to sub task mappings 230 as well the process of adding, changing, or removing code templates in 225 to be used when generating artifacts in 120.

Figure 10:
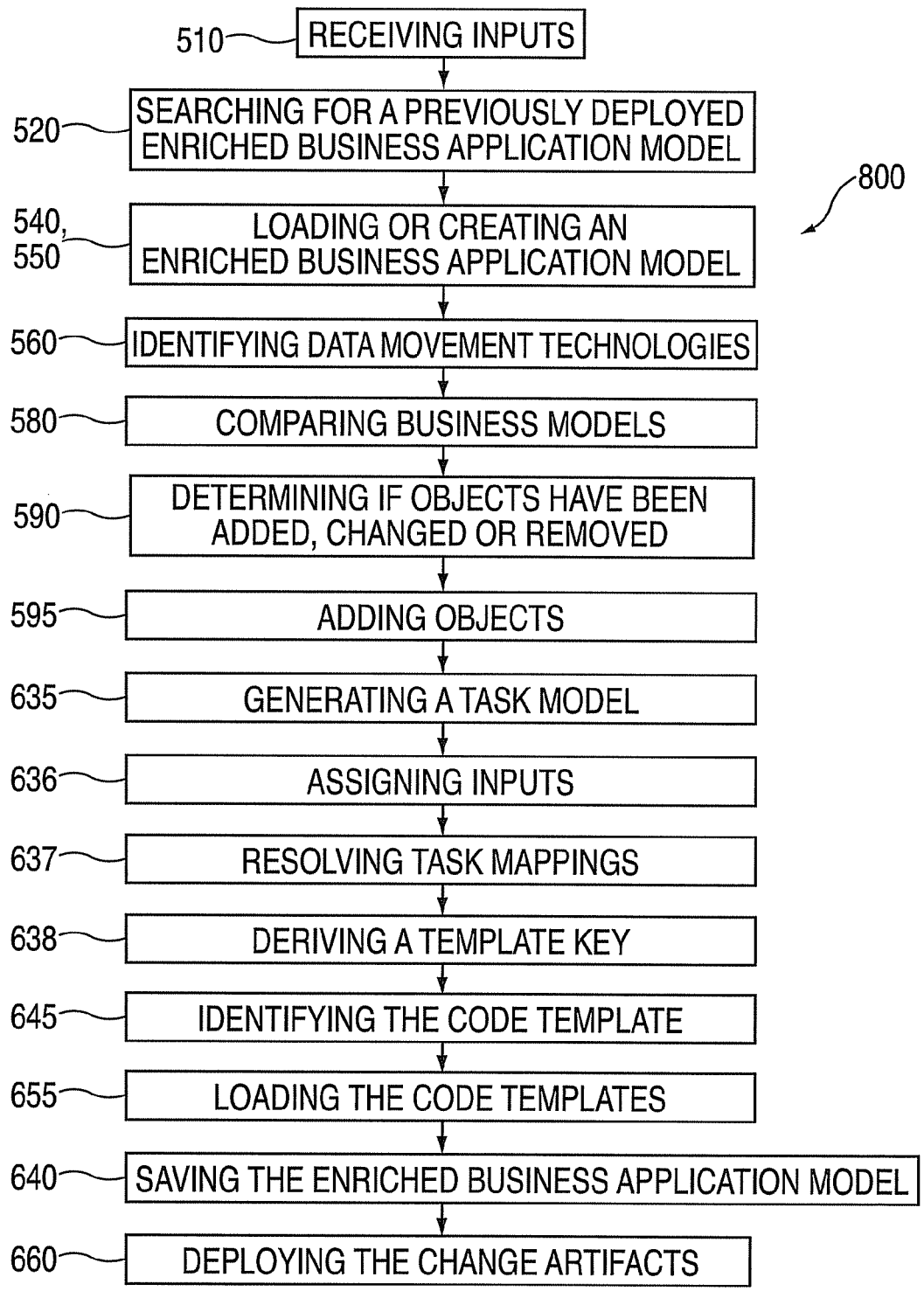
FIG. 10 illustrates another example of a detailed flowchart of a method to setup source and target systems to replicate business data in accordance with an embodiment of the invention.

Referring now to FIGS. 2 and 10 in conjunction with FIG. 1, more detailed examples of flow charts 500, 800 of the general flow chart 100 is depicted. In an embodiment, the method will begin with receiving 510 a plurality of inputs 200, including: a first business application model 210 containing business application objects, such as a specification definition for any required data movement and optionally transformation; a list of historical enriched business application models 205 and their deployment status (e.g. deployed, not deployed); a system configuration description 215, defining the source and target data source types and configurations; user preferences 220, identifying key settings, that will affect the subsequent Replication Manager behavior; code template libraries 225; and task to subtask mappings 230.

The method continues with searching 520 for the previously processed and deployed historical enriched business application model 205 based upon the first business application model 210. Following decision block 530 is loading 540 of the most recently previously deployed historical enriched business application model 205 or creating 550 the first instance of the historical enriched business application model 25 if no previously deployed enriched business application model 305 associated with the current business application model 210 was found. Evaluation of decision block 530 is also affected by user preference 220 specifying whether all existing deployments should be ignored for the purpose of creating a completely new data movement/transformation infrastructure.

Next, identifying 560 suitable data movement or transformation technologies based upon: technology previously selected in historical enriched business application model 205; system configuration description 215, defining the source and target database configurations and which data movement technologies are available; and, user preferences 220, which may include, exclude, or rank available technologies listed in the system configuration description 215. Selection of data movement technologies has a direct impact on the enriched business application core model 305 to be created in step 570 and the subsequent analysis and population process.

Continuing with comparison 580 of the business application model 210 and the historical, or previously deployed, enriched business application model 205, which was loaded in 540 or created in 550, the method determines and identifies objects within the first business application model that have been added, modified or removed relative to objects contained within the previously processed and deployed historical enriched business application model. Proceeding further, the method populates the enriched business application model 305 by adding 595 objects to the enriched business application model 305 or modifying or removing existing model objects to reflect changes between the first business application model 210 and the previously processed and deployed historical enriched business application model 205 and creates and generating 635 a task model 310 comprising of tasks for all significant model object changes; each task identifying a potential change in the data movement/transformation infrastructure in response to the new business application requirements to trigger the generation of change management artifacts in the next step.

Evaluating decision box 590, the method determines whether task model 310 contains at least one task, indicating that changes in the current data movement/transformation infrastructure are necessary. If necessary, assigning 636 inputs to each task, where inputs are references to the newly built enriched business application model, references to the previously deployed historical enriched business application model and other information made available by Replication Manager. In the absence of any tasks, the method saves 591 the populated enriched business application model 305 and stops execution 596.

Having all model changes identified, the method resolves 637 and loads 592 the customizable task to sub-task mappings 230. Proceeding further, the method identifies for each task in task model 310 the sub-tasks that need to be executed to generate the change artifacts that alter the data movement/transformation infrastructure. Factoring in the system configuration description 215 and the sub-task identifiers, the method calculates lookup keys and derives 638 a template key for each resolved sub-task based on the sub-tasks information and identifying 593, 645 the code template for each derived template key from the hierarchical code libraries, matches those look up keys against the template keys registered in code template library 225. The code templates are loaded 655 and subsequently populated with data from the enriched business application model 305, data from the historical enriched business application model 205 and other relevant information made available by the sub-tasks. Populated code templates are stored as change artifacts 315. Also generated for each change artifact is a deployment artifact entry in a deployment artifact 315. These deployment artifacts are also known as master scripts. Each change artifact is associated with a deployment type, using this deployment type along with error specifications associated with the sub task, a lookup in the code template library is performed and the appropriate code template is populated and added to the deployment artifact 315 which is responsible for deploying the change artifacts, recognizing error conditions, and taking appropriate steps for error recovery if needed.

In an embodiment, Replication Manager can optionally consolidate 640 the generated change and deployment artifacts 315 into for subsequent deployment to set up the data movement/transformation infrastructure between sources and targets into packages that can be created using any available packaging (or compression) utility such as TAR/GZIP, ZIP or JAR. Automatic artifact packaging provides two key benefits: First, if Replication Manager doesn't have connectivity to the source or target systems for which the change artifacts were created, an administrator can manually transfer the packages to those systems, extract them and perform deployment locally. Second, the originally created artifacts for each business application model version are preserved and can easily be used as backups. Such a backup can for example be used to clone a system, like it is done in development, test and production systems.

Checking 594 the completion status for 620, all output is discarded 650 and processing terminated if any errors occurred.

Upon successful artifact generation 620, the enriched business application model 305 is saved 640 as the latest version of the historical enriched business application 320 for business application model 210. The next invocation of Replication Manager will retrieve this version as input 205 if the same business application model is processed again.

Change artifact 315 deployment 660 is performed either manually or automatically, depending on the user preferences and whether deployment prerequisites are met. Upon successful deployment, the enriched historical business application is marked as "deployed", indicating that it can be used as a baseline the next time a new version of the same business application model is processed, and the method is completed.

Replication Manager allows business applications to abstract from the underlying proprietary data movement/transformation infrastructure should the need arise to move data from a source to a target even if a heterogeneous data source/target topology is used. In its simplest embodiment, only very basic information has to be specified—the source and target data structures as well as the relationships between them. In itself, Replication Manager is not specific to the type of technology being used. The Replication Manager logic can be customized or extended by advanced administrators or data movement professionals, by adding or altering task mappings and auxiliary code template libraries. By leveraging this technology, new architectures, technologies, best practices and policy decisions can be utilized. Support for multiple source/target combinations is included, meaning that data can be moved from source A to target B and from target B to target C, as long as the business application model specification contains the appropriate mapping information.

The program storage device 405 is configured to embody a program or instructions executable by the processing machine 400 to perform the method illustrated by the flow charts 100, 500, 800. While an embodiment has been depicted with data stored upon the data storage device 405 local to the processing machine 400, it will be appreciated that the scope of the invention is not so limited, and that the invention will also apply to alternate program storage devices that are readable by the processing machine 400, such as a storage device connected to the processing unit via a network, for example.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method of automated data movement/transformation setup for business data from a source data system to a target data system, the method comprising:

receiving, by a processing machine, a plurality of inputs, including a first business application model, list of historical enriched business application models and their deployment status with respect to deployed or not deployed, system configuration description, user preferences, code template libraries and task to subtask mappings, wherein the first business application model comprises business application objects, requirements for data movement and transformation;

searching, by the processing machine, for a previously processed and deployed historical enriched business application model version that is based on the first business application model, wherein the previously processed and deployed historical enriched business application model version is an output of a previous invocation of a replication manager which used an earlier version of the first business application model as an input thereto;

loading, by the processing machine, an instance of the previously processed and deployed historical enriched business application model in response to the presence of the previously processed and deployed historical enriched business application model, or creating a first instance of the historical enriched business application model comprising the technical information in response to the absence of the previously processed and deployed historical enriched business application model;

identifying, by the processing machine, a set of data movement/transformation technologies to be used based on the set of data movement/transformation requirements as defined by the first business application model, the system configuration description, and the user preferences;

comparing, by the processing machine, the first business application model to the previously deployed historical enriched business application model;

determining, by the processing machine, if objects contained within the first business application model have been added, changed or removed relative to objects contained within the previously processed and deployed historical enriched business application model;

adding, by the processing machine, objects to an enriched business application model or modifying or removing existing objects to reflect changes between the first business application model and the previously processed and deployed historical enriched business application model;

generating, by the processing machine, a task model comprising a set of tasks for all significant model object changes, each task identifying a potential change in the data movement/transformation technologies in response to new business application requirements;

assigning, by the processing machine, inputs to each task, wherein the inputs are references to the first instance of the enriched business application model, and the previously deployed historical enriched business application model;

resolving, by the processing machine, a set of customizable task to sub-task mappings;

deriving, by the processing machine, a template key for each resolved sub-task based on the sub-task information;

identifying, by the processing machine, a code template for each derived template key from a set of hierarchical code libraries;

loading and processing, by the processing machine, the code templates with inputs assigned to each task to generate change artifacts and to generate deployment artifacts that will transform the existing data movement infrastructure to meet the first business application model requirements;

saving, by the processing machine, the enriched business application model as a historical enriched business application model; and deploying, by the processing machine, the generated change artifacts to update the data movement/transformation technologies and marking the historical enriched business application model as deployed upon successful completion.

2. The method of claim 1, wherein the loading and processing code templates comprises at least one of the following:
SQL scripts;
operating system scripts; and
scripts to run against proprietary data movement applications.

3. The method of claim 1, wherein the receiving a plurality of inputs comprises receiving the system configuration description comprising at least one of:
database management system attributes;
available data movement technologies supporting source and target database combinations; and
source and target operating system attributes.

4. The method of claim 1, wherein the deriving a template key comprises the template key comprising at least one of:
sub-task attributes;
source operating system attributes;
target operating system attributes;
database management system source type attributes; and
database management system target type attributes.

5. The method of claim 1, wherein:
the identifying the code template from the set of hierarchical code libraries comprises the set of hierarchical code libraries ordered from lowest to highest level.

6. The method of claim 1, wherein:
identifying the code template comprises locating the lowest level code template library containing the derived template key.

7. The method of claim 1, further comprising:
consolidating the generated change and deployment artifacts for subsequent deployment to set up the data movement/transformation infrastructure between sources and targets.

8. The method of claim 1, wherein the receiving a first business application model comprises:
receiving a specification that is business application neutral and expressed using XML.

9. The method of claim 1, wherein:
the receiving a plurality of inputs, including a first business application model comprises:
business application object definitions;
relationships between business application objects and storage structures; and
relationships between the database structures.

10. A program storage device readable by a machine, the device embodying a program or instructions executable by the machine to perform the method of claim 1.

* * * * *